3,415,796
EXTRUDED MATTE FINISH ACRYLIC FILM
Louis Charles Souder, Levittown, Pa., John Alexander Powell, Willingboro, N.J., and Fred Andrew Hajduk, Lansdale, Pa., assignors to Rohm & Haas Company, Philadelphia, Pa., a corporation of Delaware
No Drawing. Filed Mar. 24, 1966, Ser. No. 537,000
9 Claims. (Cl. 260—86.1)

This invention relates to the production of flattened tubular thermoplastic film. More particularly, this invention relates to blown and extruded acrylic thermoplastic film having a matte or roughened surface, and to a method of making such film.

Acrylic and other thermoplastic films having a roughened or patterned surface have heretofore been produced by a variety of techniques. Typically, these involve a separate postforming step; for example, a postextrusion or postcalendering treatment utilizing some type of mechanical device such as embossing rolls, sand blasting equipment, etc. Satin surfaced or matter surfaced films have also been produced by melt casting a film-forming resin upon a chill-roll that has a satin or matte finished surface.

The present invention avoids the use of external mechanical treating devices such as embossing rolls and the like; moreover, the film obtained in the present invention is roughened or matte surfaces on both sides, i.e., on its inner side and its outer side and is so obtained during the film forming operation. The present invention achieves these results by the use of certain acrylic thermoplastic resins and certain extrusion conditions in the known blown-tube method of film formation, all as more particularly defined and set forth hereinafter.

The preparation of plastic film by the blown-tube method is well known. For example, U.S. Patents Nos. 2,461,975, 2,461,976 and 2,632,206 disclose extrusion apparatus and processes wherein a thermoplastic material in a formative plastic state is extruded through an annular or circular die to form seamless tubing and is withdrawn from the die by a pair of squeeze or nip rolls spaced from the point of extrusion. As the tubing advances to the nip rolls and while it is in the formative plastic state it is inflated to a predetermined diameter by a gaseous medium introduced into the interior of the tubing. Typically, a cooling gaseous medium such as air is blown onto the exterior peripheral surface of the tubing in the vicinity of the point of extrusion to cool the tubing to an extent that when the tubing has been inflated to a predetermined diameter, it will be in a set condition. The tubing in the set condition after gradually being collapsed is then flattened upon passage through the squeeze or nip rolls; take-up equipment then winds the flattened tube onto a reel after which it may be slit or cut into single lengths; the cutting or slitting may also be performed before the reeling operation.

In order to obtain the desired matte finish or surface with thermoplastic acrylic resins in the blown-tube method, as hereinbefore described, the acrylic resin must have a melt index in the range of from 0.1 to 3, and, more preferably, a range of from about 0.5 to 2.5; additionally, the acrylic resins useful in the present invention have a glass transition temperature of from 30° to 80° C., with 40° to 65° C. being preferred. Thermoplastic acrylic resins or polymers having the above characteristics, and therefore being useful in the present invention, may comprise homopolymers of $C_2$ to $C_4$ alkyl ester of methacrylic acid such as the homopolymer of ethyl methacrylate, the homopolymer of isopropyl methacrylate, the homopolymer of sec-butyl methacrylate, etc., and copolymers of a lower alkyl ester of methacrylic acid with a $C_1$ to $C_8$ alkyl acrylate. The term "lower alkyl ester of methacrylic acid" is taken to mean a $C_1$ to $C_4$ alkyl methacrylate such as, for example, methyl methacrylate, ethyl methacrylate, etc. Because of commercial availability copolymers based on methyl methacrylate are preferred. Particularly desirable are copolymers containing 50 to 85 weight percent of methyl methacrylate, the balance, i.e., 50 to 15 weight percent, being $C_1$ to $C_8$ alkyl acrylate, with ethyl acrylate and butyl acrylate being the alkyl acrylates of choice. The acrylic resins may be prepared by any of the conventional techniques used in the art today. These include, for example, suspension polymerization, emulsion polymerization and bulk or batch polymerization.

Acrylic resins useful in the present invention may be extruded with development of matte in the blown bubble or tube at temperatures ranging from a temperature above the softening or melting point of the acrylic resin to a temperature below that at which any significant decomposition of the resin occurs, for example, as evidenced by the formation of bubbles; these temperatures will ordinarily range from about 350° F. to about 500° F. at the extruder die. Moreover, the degree of matte finish may be controlled by varying the temperature, with the lower the extrusion temperature the more the matte, and the higher the extrusion temperature the less the matte finish, for an acrylic resin of fixed melt index. While all the acrylic resins useful in the present invention are of relatively high molecular weight, it may be noted that the higher the melt (low molecular weight) index, the less tendency there is to form a matte surface and, conversely, the lower the melt index, (higher molecular weight) the greater the tendency to form a matte surface. In order to develop fully the matte surface during the extrusion of the tubular film, it is preferred to extrude said tubular film at a temperature at least 20° F. below the temperature at which any significant decomposition of the film-forming acrylic resin takes place, as hereinbefore noted, and above the temperature at which the film-forming acrylic resin softens and flows. The extruder may be of conventional design and, per se, forms no part of the present invention. Extrusion pressures may be varied over a considerable range, but usually they will be in the range of 2000 to 7000 p.s.i.

In the specification and claims and in the following examples, all parts and percentages are by weight unless otherwise mentioned. The term "melt index," referred to hereinbefore, and as used hereinafter, is used in its conventional sense, i.e., it is equivalent to the number of grams of resin or polymer passing through a standard orifice in a ten-minute period of time under certain stated conditions; melt index is determined at 200° C., under a pressure of 200 p.s.i. gauge, using a standard ASTM melt index die or orifice as set forth in ASTM 1238–57T.

The following conditions prevail in the following examples, unless statements to the contrary are given: Three (3) mil tubular film is extruded and blown using a 1″ extruder equipped with a 1½″ annular die at the rate of 10–12 lbs. per hour. The blowup ratio is maintained between 2 and 3 to 1. The vertically moving "bubble" or blown tube is lightly cooled with air from a cooling ring located just above the die exit; the tube is then gradually collapsed and taken through a pair of nip rolls to a windup reel.

EXAMPLE 1

A bulk polymerized copolymer of 64% by weight methyl methacrylate and 36% by weight ethyl acrylate having a melt index of 2.0, and a glass transition temperature of about 46° C. is extruded and blown into tubular film at a die temperature of 450° F. and under the general conditions set forth above. The film has a matte finish on both its inside and outside surfaces. It also has a total white light transmittance value of 92.0, a percent haze value of 40.8; tensile strength of the film is 5850 p.s.i. in the machine direction and 7140 p.s.i. in the transverse direction.

EXAMPLE 2

Repeating the procedure of Example 1, there may be used a homopolymer of ethyl methacrylate of 0.75 melt index. Poly(ethyl methacrylate) has a glass transition temperature of 65° C. A film is obtained having a matte surface on both its inside and outside.

EXAMPLE 3

A suspension polymerized copolymer of 75% by weight methyl methacrylate and 25% by weight ethyl acrylate, having a melt index of 1.0 and a glass transition temperature of about 63° C., is extruded and blown into tubular film at a die temperature of 500° F. Bubbling and release of monomer vapors pocked the surface and thickness of the film. By reducing the die temperature to 480° F. there is produced a film having a matte surface (inside and outside) with the following characteristics: a total white light transmittance value of 92.5, a percent haze value of 25.4, a tensile strength of 8070 p.s.i. in the machine direction and 8960 p.s.i. in the transverse direction.

EXAMPLE 4

Variation of melt index

A series of runs is made with an acrylic copolymer of 72.7% by weight methyl methacrylate and 27.3% by weight ethyl acrylate, but having different melt indices. Extrusion die temperature is 400° F. A matte surface or finish is obtained when the melt index is (a) 0.32 and (b) 0.92. With a melt index (c) of 5.5 only a clear finish and film is obtained.

EXAMPLE 5

Variation of extrusion temperature

A series of runs is made with a copolymer having a melt index of 1.8; the copolymer is composed of 64% by weight methyl methacrylate and 36% by weight of ethyl acrylate. The appearance of the film is noted and reported in the table below.

| Run | Extruder die temperature (° F.) | Pressure (p.s.i.) | Film appearance |
|---|---|---|---|
| a | 360 | 7,100 | Large irregular grain matte. |
| b | 375 | 6,200 | Do. |
| c | 400 | 5,600 | Finer matte. |
| d | 425 | 5,100 | Still finer matte. |
| e | 475 | 3,600 | Very fine matte. |
| f | 500 | 3,000 | Bubbles from decomposition. |

This example shows that the degree of matte can be controlled by varying the extrusion temperature. The rate of extrusion is the same in each run and the pressure decreases with increasing temperature, but it is obvious that the pressure could be maintained essentially constant by varying the rate.

The acrylic matte finish film of the present invention has been found to be desirable for a number of reasons important to the use of resinous film in various applications. In the use of the film as an element in combination with adhesives for bonding the film to various substrates, the matte finish improves the anchoring relationship between the resinous film and the substrate. The film may be used as a base for photosensitive material, as a base for film transparencies, or as a printing base, etc. The film material of the present invention is also particularly useful as a protective layer in laminating and overlay applications. The acrylic matte finish film can be directly laminated to metallic and nonmetallic substrates.

An unusual and very practical feature of our matte film is its ability to be converted to a brilliantly clear film during normal laminating operations. In an example, a matte finish acrylic film, made by and composed of the composition of Example 1 above, is placed on both sides of 20 mil rigid polyvinyl chloride credit card stock. The resulting sandwich is placed between polished chrome metal cauls and subjected to the following pressing cycle in a hydraulic press:

(1) 1700 p.s.i.—300° F. for 5 minutes
(2) 1700 p.s.i.—full cooling to room temperature—9 minutes
(3) Pressure release—laminate removal.

The resulting laminate exhibits a clear and smooth high gloss surface. Without desiring to be limited to any particular theory, it is, however, believed that the minute crevices, or hills and valleys, in the surface of our matte finish acrylic film allow air or other gases, which ordinarily would be trapped, to escape during the lamination operation. The lamination cycle above described is for illustrative purposes only, as a wide range of pressure/ temperature/time conditions can be used to achieve good lamination. Preferably, the lamination takes place without the use of any external adhesive.

Although the acrylic film per se has outstanding resistance to ultraviolet (UV) light degradation and outdoor weathering, it is sometimes desirable to incorporate therein one or more UV absorbers for additional protection of the substrate. Representative examples of UV absorbers which may be incorporated in our acrylic matte film include, for example, 2,4-dihydroxybenzophenones; 2,(2'-hyroxy-5'-methylphenyl)benzotriazole; and 4-dodecyloxy-2-hydroxybenzophenone.

The matte finish or matte surface acrylic plastic film of the present invention is self-sustaining and is ordinarily produced in thicknesses ranging from about ½ mil to about 10 mils, although greater thicknesses can be made, if desired.

The term "glass transition temperature" (i.e., the second order transition temperature (Tg)) as used herein and in the claims is intended to mean and connote the phenomena and conditions normally applied by the art to said term, as, for example, set forth in "Properties and Structure of Polymers," Tobolsky, John Wiley & Sons, New York, 1960, pages 61–81.

We claim:

1. In the method of forming flattened, tubular thermoplastic film wherein heated and softened thermoplastic resin is extruded through an orifice in the form of tubing, a fluid medium is introduced therein to expand the same, and said expanded tubing is collapsed to form the flattened product, the improvement which comprises forming said thermoplastic film in matte finish form by extruding an acrylic resin selected from the group consisting of homopolymers of $C_2$ to $C_4$ alkyl esters of methacrylic acid and copolymers of a lower alkyl ester of methacrylic acid with a $C_1$ to $C_8$ alkyl acrylate, said resin having a melt index of 0.1 to 3 and a glass transition temperature of 30° to 80° C.

2. Method according to claim 1 wherein the acrylic resin is a copolymer of methyl methacrylate and a $C_1$ to $C_8$ alkyl acrylate.

3. Method according to claim 1 wherein the acrylic resin is a copolymer of 50 to 85 weight percent methyl methacrylate and 50 to 15 weight percent of a $C_1$ to $C_8$ alkyl acrylate.

4. Method according to claim 3 wherein the alkyl acrylate is ethyl acrylate.

5. Method according to claim 3 wherein the melt index of said acrylic resin is in the range of 0.5 to 2.5.

6. Method according to claim 1 wherein the degree of matte finish is controllably reduced by increasing the temperature at which the acrylic resin is extruded.

7. Method according to claim 1 wherein the acrylic resin is extruded at a temperature above its softening point but at least 20° F. below the temperature at which any significant decomposition of said acrylic resin takes place.

8. Matte finish acrylic thermoplastic film produced according to the method of claim 1.

9. The matte finish acrylic thermoplastic film produced according to the method of claim 3.

References Cited

UNITED STATES PATENTS

| 2,922,194 | 1/1960 | Lampard et al. | 264—95 X |
| 3,235,632 | 2/1966 | Lemmer et al. | 264—95 X |
| 3,345,434 | 10/1967 | Griffith | 264—94 X |

ROBERT F. WHITE, *Primary Examiner.*

T. J. CARVIS, *Assistant Examiner.*

U.S. Cl. X.R.

161—164; 260—89.5; 264—95, 209